United States Patent
Lim et al.

(10) Patent No.: US 6,956,397 B2
(45) Date of Patent: Oct. 18, 2005

(54) TEMPERATURE ADAPTIVE REFRESH CLOCK GENERATOR FOR REFRESH OPERATION

(75) Inventors: Jung-Don Lim, Seoul (KR); Mi-Kyeong Yun, Seongnam-si (KR)

(73) Assignee: Coremagic Inc., Gyeonggi-do (KR)

(*) Notice: Subject to any disclaimer, the term of this patent is extended or adjusted under 35 U.S.C. 154(b) by 123 days.

(21) Appl. No.: 10/726,097

(22) Filed: Dec. 1, 2003

(65) Prior Publication Data
US 2004/0108907 A1 Jun. 10, 2004

(30) Foreign Application Priority Data
Dec. 4, 2002 (KR) .................................. 10-2002-0076713

(51) Int. Cl.[7] .............................................. H03K 17/16
(52) U.S. Cl. ............................. 326/31; 326/93; 323/907
(58) Field of Search .................. 326/31, 32, 93–98; 323/907

(56) References Cited

U.S. PATENT DOCUMENTS

| | | | | |
|---|---|---|---|---|
| 5,180,995 A | * | 1/1993 | Hayashi et al. | 331/57 |
| 6,628,558 B2 | * | 9/2003 | Fiscus | 365/222 |
| 6,707,745 B2 | * | 3/2004 | Mizugaki | 365/222 |
| 6,873,143 B2 | * | 3/2005 | Moon et al. | 323/312 |
| 2005/0030109 A1 | * | 2/2005 | Kim | 331/16 |

FOREIGN PATENT DOCUMENTS

| | | |
|---|---|---|
| KR | 1997-123827 | 11/1997 |
| KR | 1997-131176 | 4/1998 |

OTHER PUBLICATIONS

Examiner Byung–II An, Korean Intellectual Property office, Notice of Preliminary Rejection, Dec. 15, 2004 (and English language translation).

* cited by examiner

*Primary Examiner*—Don Le
(74) *Attorney, Agent, or Firm*—Sheridan Ross P.C.

(57) ABSTRACT

The present invention provides a refresh clock generator which optimally controls a period of a refresh clock signal according to temperature variation and outputs the refresh clock signal. The refresh clock generator includes a bias voltage generating unit for generating first and second bias voltages in response to a temperature variation and a clock generator for generating a refresh clock signal having a frequency which is controlled or adjusted based on the first and second bias voltages, wherein the first bias voltage is varied in proportion to the temperature variation; the second bias voltage is varied in inverse proportion to the temperature variation; and the frequency of the refresh clock signal is varied in proportion to the temperature variation.

20 Claims, 7 Drawing Sheets

TEMPERATURE ADAPTIVE REFRESH CLOCK GENERATOR FOR REFRESH OPERATION

FIELD OF THE INVENTION

The present invention relates to semiconductor memory devices, and more particularly, to a refresh clock generator for controlling a refresh operation of the semiconductor memories adaptive to a temperature variation.

DESCRIPTION OF RELATED ART

In general, semiconductor memory device can be classified by Random Access Memory (hereinafter, referred as RAM) and Read Only Memory (hereinafter, referred as ROM). The RAM is volatile, but the ROM is nonvolatile. Namely, the ROM can keep stored data even though power supply is removed, but the RAM cannot keep stored data if the power supply is removed.

The RAM is further classified by Dynamic Random Access Memory (hereinafter, referred as DRAM) and Static Random Access Memory (hereinafter, referred as SRAM). Each memory cell of the SRAM includes six transistors (or four transistors and two resistors) that constitute a latch for storing data. The latch can reserve the data as long as a power source is supplied. In contrast, the memory cell of the DRAM has one transistor and one capacitor for storing data. Data stored in the DRAM means the electrical charge in the capacitor, and the electrical charge amount is reduced in proportion to a data storing time. Therefore, in the DRAM, a periodic refresh operation should be performed by constantly refreshing the memory cells to thereby maintain the stored data.

In addition, the DRAM receives a column address and a row address for selecting a memory cell. The row address is converted to a word line selection signal for selecting one of word lines included in the cell block and the column address is converted to a bit line selection signal for selecting one of bit lines included in the cell block.

In the DRAM, one cycle of the refresh operation includes following steps: selecting the word line in the cell block; amplifying charge of stored data in the capacitors in response to the selected word line; and restoring the amplified data in the capacitors. The word lines are sequentially selected at every cycle of the refresh operation. Throughout the refresh operation, each charged data is restored in each memory cell without any loss.

In the refresh operation, the DRAM needs a refresh clock for selecting a different word line at every cycle. A refresh clock generator for the refresh operation is used in generating the refresh clock and the refresh operation is performed on the basis of the generated refresh clock.

Figure 1:
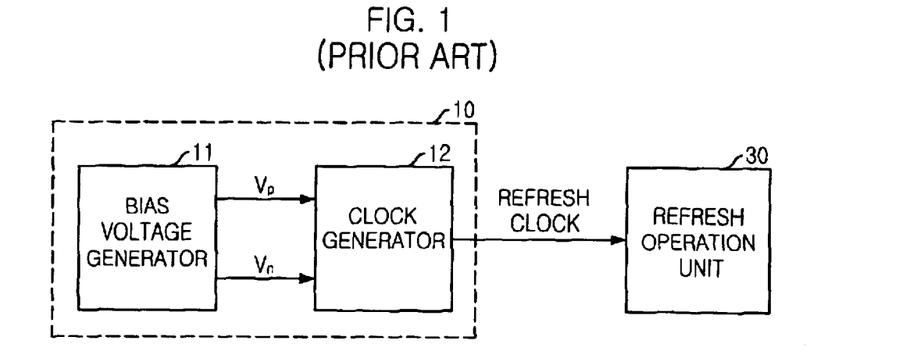
FIG. 1 is a block diagram of a conventional refresh circuit.

FIG. 1 is a block diagram of a conventional refresh circuit.

As shown, the conventional refresh circuit for a refresh operation includes a refresh clock generating unit 10 and a refresh operation unit 30. The refresh clock generating unit 10 is used to generate a refresh clock signal and includes a bias voltage generator 11 and a clock generator 12. The bias voltage generator 11 generates first and second bias voltages Vp and Vn which are coupled to the clock generator 12. The bias voltages Vp and Vn are used in determining a frequency of the refresh clock signal outputted from the clock generator 12. The clock generator 12 generates the refresh clock signal frequency-controlled by using the first and second bias voltages Vp and Vn, and the refresh clock signal is then supplied to the refresh operation unit 30. The refresh operation unit 30 receives the refresh clock signal and executes the refresh operation based thereon.

Figure 2:
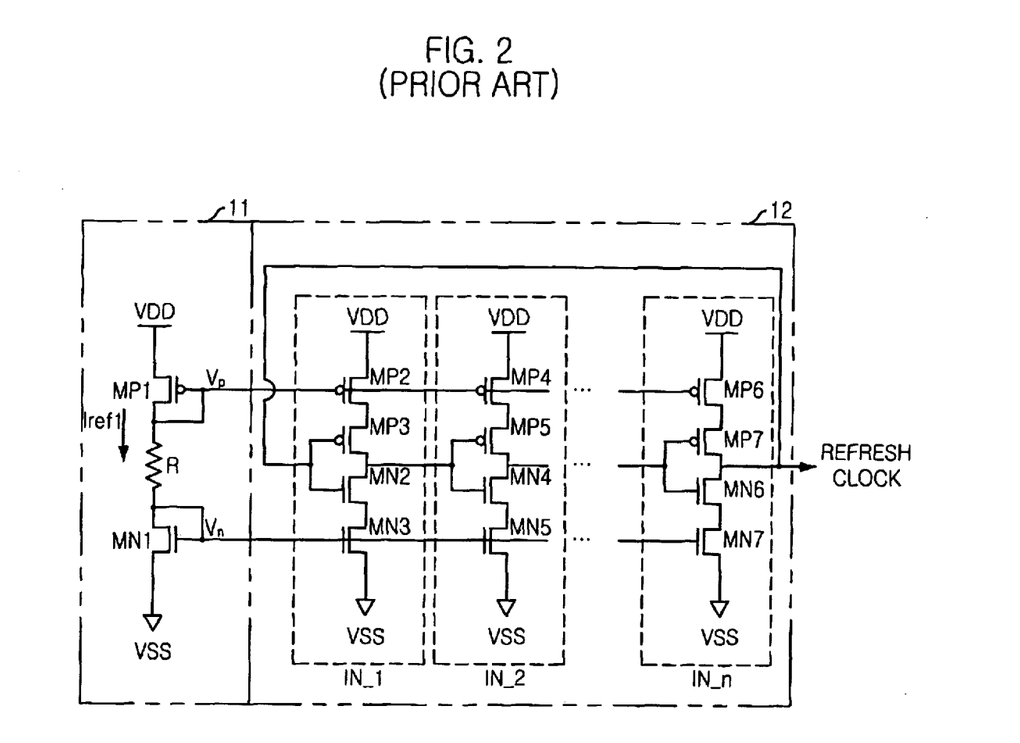
FIG. 2 is a schematic circuit diagram of the bias voltage generator and the clock generator included in the refresh clock generator shown in FIG. 1.

FIG. 2 is a schematic circuit diagram of the bias voltage generator 11 and the clock generator 12 included in the refresh clock generation unit shown in FIG. 1.

The bias voltage generator 11 includes a PMOS transistor MP1, a resistor R, and a NMOS transistor MN1. The source of the PMOS transistor MP1 is connected to a supply voltage source VDD. The gate of the PMOS transistor MP1 is connected to it's drain to generate the first bias voltage Vp. The resistor R is connected between the drain of the PMOS transistor MP1 and the drain of the NMOS transistor MN1. The source of the NMOS transistor MN1 is connected to a ground voltage source VSS. The gate of the NMOS transistor MN1 is connected to it's drain to output the second bias voltage Vn.

The clock generator 12 includes a number of serial-connected delay controllable inverters IN_1, IN_2, . . . , and IN_n, wherein n is a positive integer. Like a ring oscillator, output of the last delay controllable inverter IN_n is coupled back to input of the first delay controllable inverter IN_1 and also coupled, as a refresh clock, to the refresh operation unit shown in FIG. 1.

First delay controllable inverter IN_1 has PMOS transistors MP2 and MP3 and NMOS transistors MN2 and MN3. The PMOS transistor MP3 and the NMOS transistor NM3 are operated as an inverter. The PMOS transistor MP2 and the NMOS transistor MN2 serve as a delay control of the inverter IN_1. The first and second bias voltages Vp and Vn are inputted at gates of them and a delay value of the inverter IN_1 is controlled or adjusted depend on the first and the second bias voltages Vp and Vn.

In the clock generator 12, each delay controllable inverter IN_m−1 receives an output signal of the previous delay controllable inverter IN_m−2 and provides the inversed output signal to the next delay controllable inverter IN_m, wherein m is a positive integer between 3 and n. The last delay controllable inverter IN_n outputs the refresh clock signal to the first delay controllable inverter IN_1 and the refresh operation block 30.

Figure 3:
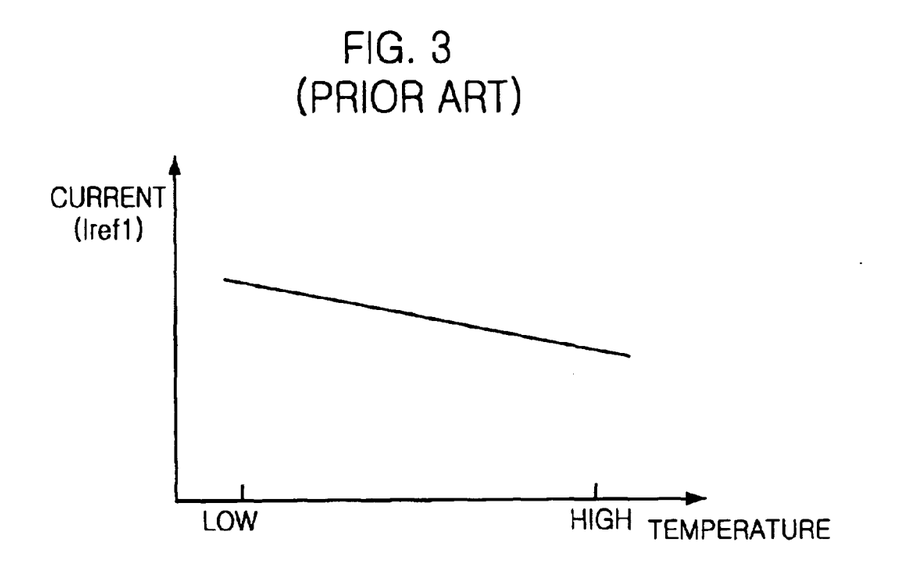
FIG. 3 describes a graph showing a relationship of a reference current and a temperature in the bias voltage generator shown in FIG. 2.
Figure 4:
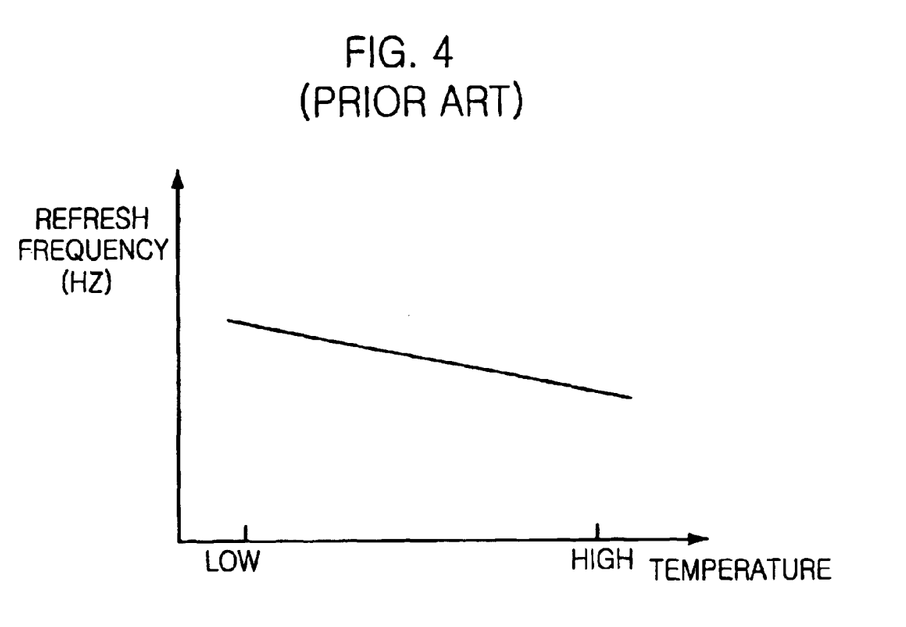
FIG. 4 shows a graph showing a characteristic of the refresh frequency versus a temperature in the clock generator described in FIG. 2.
Figure 5:
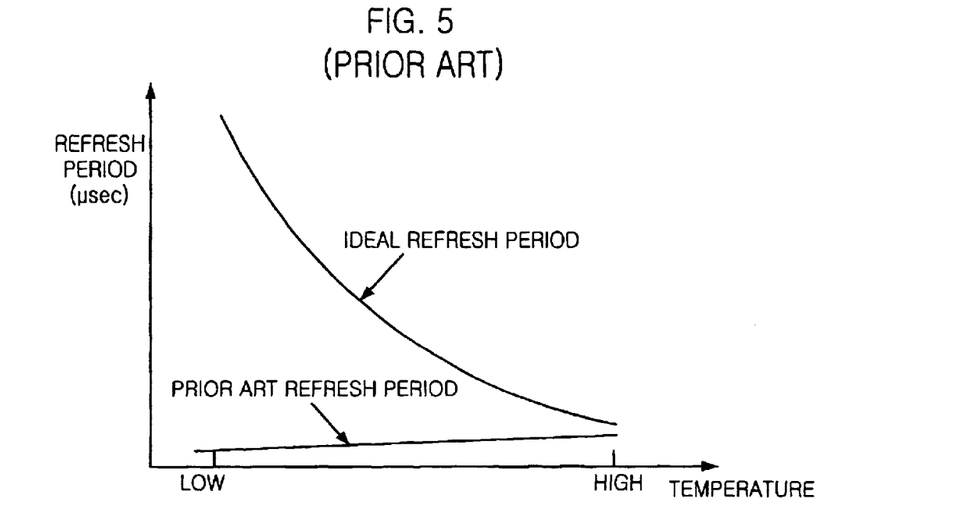
FIG. 5 is a graph showing the characteristic of the refresh period versus a temperature in the refresh clock generator described in FIG. 2.

FIG. 3 describes a graph showing a relationship of a reference current Iref1 and a temperature in the bias voltage generator 11 shown in FIG. 2. FIG. 4 shows a graph showing a characteristic of the refresh frequency versus a temperature in the clock generator 12 described in FIG. 2.

Hereinafter, referring to the accompanying drawings from FIGS. 1 to 4, the conventional refresh clock generating unit will be described in detail.

First of all, if the supply voltage source VDD and the ground voltage source VSS are provided to the refresh circuit, the PMOS transistor MP1 and the NMOS transistor MN1 of the bias voltage generator 11 are turned on. As a result, a predetermined reference current Iref1 is flowed from the supply voltage source VDD to the ground voltage source VSS through the resistor R. If the reference current Iref1 flows through the PMOS transistor MP1, the NMOS transistor MN1 and the resistor R, each gate of the PMOS transistor MP1 and the NMOS transistor MN1 is supplied with each bias voltage Vp/Vn which is coupled to the clock generator 12. That is, each gate of the PMOS transistor MP1 and the NMOS transistor MN1 is connected to the drain of NP1 and MN1 respectively. The two gate connected bias voltages are Vp/Vn which are coupled to the clock generator 12.

Subsequently, the delay controllable inverters IN_1, IN_2, . . . , and IN_n are enabled by the first and second predetermined bias voltages Vp and Vn used in determining delay value of each delay controllable inverter. The clock generator 12 generates the refresh clock signal which is provided to the refresh operation unit 30. The operation of the clock generator 12 is similar to that of a well known ring oscillator, and therefore, for the sake of convenience, no further explanation thereon will be described.

On the other hand, if an environment temperature of the DRAM device including the conventional refresh clock generator 10 is increased, a resistance of the resistor R is increased. Since the current quantity, which flows throughout the resistor R, is deeply dependent on the resistance of the resistor R, i.e., the equation I=V/R, the current quantity is decreased and the bias voltages Vbp/Vbn are settled in range of values which can diminish the current quantity.

The current quantity flowing through MP2, MP4 and MP6 is decreased, since the current quantity, which flows through each delay controllable inverter, is determined by the bias voltages Vbp and Vbn. As a result, when each delay controllable inverter is operated at high temperature, each delay controllable inverter has a longer delay value so that the frequency of the refresh clock signal becomes lower.

As described above, the voltage levels of the first and second bias voltages Vp and Vn are used in determining a frequency of the refresh clock. As a result, the frequency of the refresh clock is varied in inverse proportion to the temperature, as shown in FIG. 4.

However, it is desired that the period of the refresh operation should be decreased in proportion to the temperature because stored charge leakage of the capacitor in the DRAM is increased in proportion to the temperature. If the temperature is high, stored data in DRAM would loss quickly because of increasing charge leakage. If the temperature is low, stored data would be maintained for relatively long time because charge leakage is slowly occurred. Namely, the desired refresh period should be decreased adaptive to a low temperature.

However, if a conventional DRAM uses the refresh clock outputted from the refresh clock generating unit shown in FIGS. 1 and 2 according to the prior art, there is often occurred a problem that charge leakage may be largely increased in a high temperature because of the longer refresh frequency. On the other hand, a power consumption may be dramatically increased in a low temperature due to unnecessary refresh operation.

SUMMARY OF THE INVENTION

It is, therefore, an object of the present invention to provide a refresh clock generator for solving above statement problems and outputting a refresh clock signal having a period which is properly changed according to temperature variation.

In accordance with an aspect of the present invention, there is provided with the refresh clock generator including a bias voltage generating unit for generating first and second bias voltages in response to a temperature variation and a clock generator for generating a refresh clock signal having a frequency which is controlled or adjusted based on the first and second bias voltages, wherein the first bias voltage is varied in proportion to the temperature variation; the second bias voltage is varied in inverse proportion to the temperature variation; and the frequency of the refresh clock signal is varied in proportion to the temperature variation.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTIONS OF THE INVENTION

Hereinafter, a refresh clock generator according to the present invention will be described in detail referring to the accompanying drawings.

Figure 6:
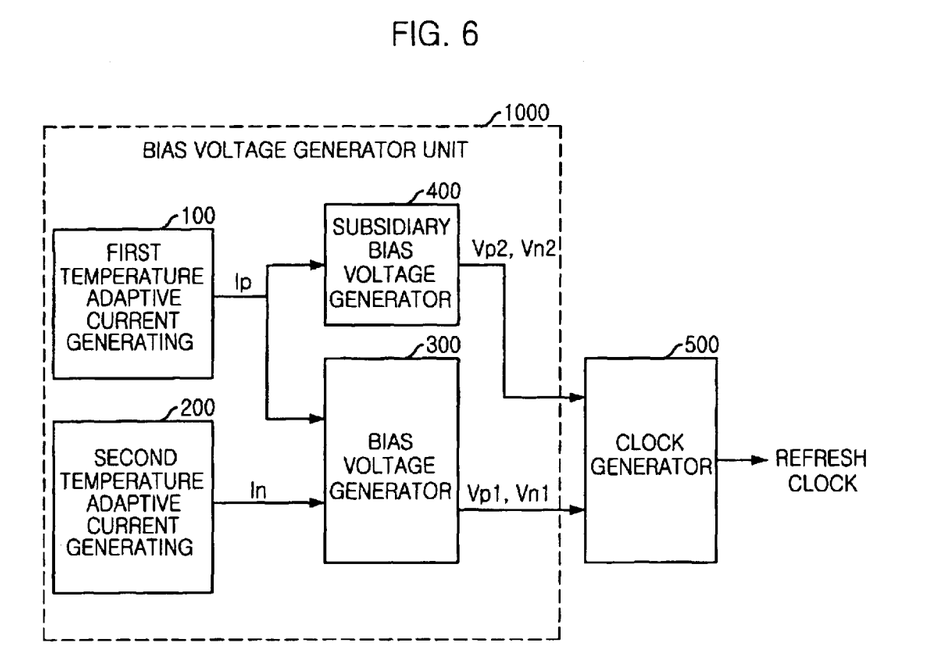
FIG. 6 is the block diagram of a refresh clock generator in accordance with a predetermined present invention.

FIG. 6 is the block diagram of a refresh clock generator in accordance with a preferred embodiment of the present invention.

As shown, the refresh clock generator in accordance with the present invention includes a bias voltage generating unit 1000 for outputting a first bias voltages Vp in proportion to temperature and a second bias voltages Vn in inverse proportion to temperature, and a clock generator 500 for outputting a refresh clock signal of which frequency is in proportion to the second bias voltages Vn and in inverse proportion to the first bias voltages Vp.

Also, the bias voltage generating unit 1000 has a first temperature adaptive current generating circuit 100 for outputting a first current Ip in proportion to a temperature, a second temperature adaptive current generating circuit 200 for outputting a second current In in inverse proportion to a temperature, and a bias voltage generator 300 for outputting bias voltages Vp1 and Vn1 corresponding to a third current (Ip−In) that subtracts the second current In from the first current Ip.

The bias voltage generator unit 1000 further has a subsidiary bias voltage generator 400 for outputting subsidiary bias voltages Vp2 and Vn2 corresponding to the first current Ip.

The clock generator 500 is controlled by a first operating current corresponding to the bias voltage levels Vp1 and Vn1 and a second operating current corresponding to the subsidiary bias voltage levels Vp2 and Vn2 in order to output the refresh clock signal based on the first and the second operating current.

Figure 7:
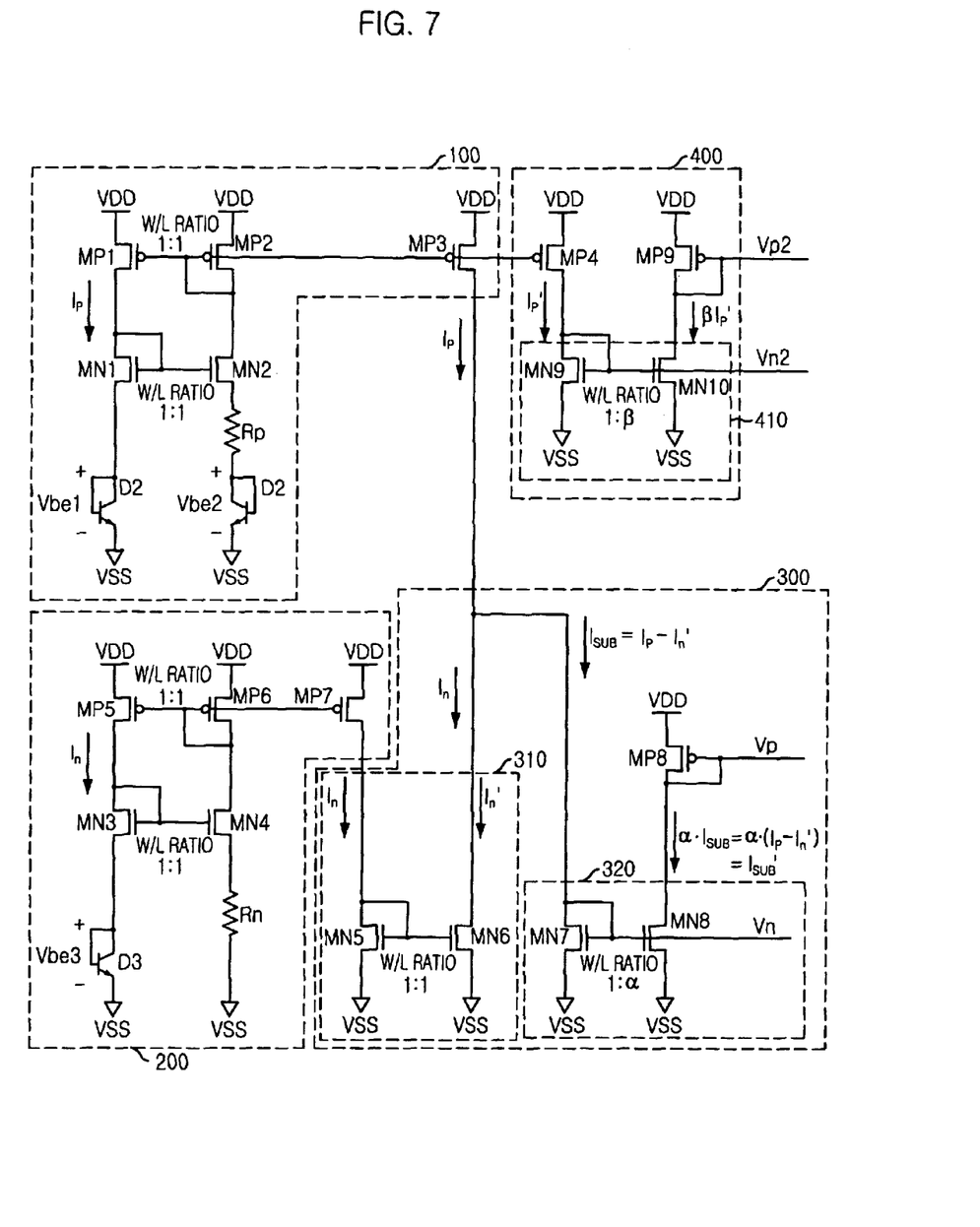
FIG. 7 is a schematic circuit diagram of a bias voltage generating unit shown in FIG. 6.

FIG. 7 is a schematic circuit diagram of a bias voltage generating unit shown in FIG. 6 in accordance with a preferred embodiment of the present invention.

As shown, the bias voltage generator 300 includes a first current-mirror 310 for flowing a forth current In' mirrored from the second current In, a first current-mirror 320 having MOS transistors MN7 and MN8 for flowing a sixth current ISUB' mirrored from a fifth current (Ip−In') that subtracts the third current In' from the first current Ip, and a diode-connected MOS transistor MP8 for flowing the sixth current ISUB' in the second current-mirror 320. Also, the sixth current (ISUB'=α×(Ip−In')) is mirrored from a current that multiplies the fifth current ISUB by α.

The first current-mirror 310 includes a diode-connected NMOS transistor MN5 for receiving the first current In at its gate and drain and connecting its source to the ground voltage VSS and a NMOS transistor MN6 for flowing the third current In', which is mirrored from the second current In, to the ground voltage VSS.

The second current-mirror 320 includes a diode-connected NMOS transistor MN7 for receiving the fifth current ISUB, which subtracts the third current In' from the first current Ip, at its gate and drain, and connecting its source to the ground voltage VSS; and a NMOS transistor MN8 for flowing the sixth current ISUB' mirrored from the fifth current ISUB. The gate of the NMOS transistor MN8 is connected to the gate of the NMOS transistor MN7.

The gate of a diode-connected PMOS transistor MP8 outputs the first bias voltage Vp1 to the clock generator 500 and the gates of the NMOS transistors MN7 and MN8 that constitutes the second current-mirror 320 output the second bias voltage Vn1 to the clock generator 500.

The first temperature adaptive current generating circuit 100 includes a PMOS transistor MP2 diode-connected, its source being connected to a supply voltage VDD and its drain to its gate; a second PMOS transistor MP1 for forming a current-mirror with the PMOS transistor MP2, its gate being connected to the gate of the PMOS transistor MP2; a NMOS transistor MN1 diode-connected, its gate and drain being connected to the drain of the PMOS transistor MP1; a NMOS transistor MN2 for forming a current-mirror with the NMOS transistor MN1, its drain being connected to the drain and gate of the PMOS transistor MP2 and its gate to the gate of the NMOS transistor MN1; a diode D1 having a positive input connected to the source of the NMOS transistor MN1 and a negative input connected to the ground voltage VSS; a resistor Rp connected to the source of the NMOS transistor MN2; a diode D2 having a positive input connected to the resistor Rp and a negative input connected to the ground voltage VSS; and a PMOS transistor MP3 for forming current mirror with the PMOS transistor MP2, its source being connected to the supply voltage VDD and its gate to the gate of the PMOS transistor MP2. The first current Ip is generated through the use of a mirroring operation of the PMOS transistor MP3.

The diodes D1 and D2 can be typical PN junction diodes and, in the FIG. 7, these are formed by connecting its base and collector of each bipolar transistor Vbe1 and Vbe2.

The second temperature adaptive current generating circuit 200 includes a PMOS transistor MP6 diode-connected by connecting its source to the supply voltage VDD and its drain to its gate; a PMOS transistor MP5 for forming a current-mirror with the PMOS transistor MP6 by connecting its source to the supply voltage VDD and its gate to the gate of the PMOS transistor MP6; a NMOS transistor MN3 diode-connected by connecting its gate and its drain to the drain of the. PMOS transistor MP5; a NMOS transistor MN4 for forming a current mirror with the NMOS transistor MN3 by connecting its drain to the drain of the PMOS transistor MP6 and its gate to the gate of the NMOS transistor MN3; a diode D3 having a positive input connected to the source of the NMOS transistor MN3 and a negative input connected to the ground voltage VSS; a resistor Rn connected between the source of the NMOS transistor MN4 and the ground voltage; and a PMOS transistor MP7 for forming a current-mirror with the PMOS transistor MP6 by connecting its source to the supply voltage VDD and its gate to the gate of the PMOS transistor MP6. The second current In is generated through the use of a mirroring operation of the PMOS transistor MP7.

The diode D3 can be a typical PN junction diode and, herein, this is formed by connecting its base and collector of a bipolar transistor Vbe3.

The subsidiary bias voltage generator 400 includes a PMOS transistor MP4 for forming a current-mirror with the PMOS transistor MP2 by connecting its source to the supply voltage VDD and its gate to the gate of the PMOS transistor MP2, the third current-mirror 410 having MOS transistors MN9 and MN10 for flowing a eighth current(β×Ip') mirrored from the seventh current Ip', which is mirrored by the PMOS transistor MP4, and a diode-connected MOS transistor MP9 for flowing the seventh current Ip' to the third current-mirror 410. The eighth current(β×Ip') is generated by multiplying the seventh current Ip' by β.

The third current-mirror 410 includes a diode-connected NMOS transistor MN9 for receiving the seventh current Ip' at its gate and drain and a NMOS transistor MN10 for flowing the eighth current(β×Ip'), which is mirrored from seventh current Ip', to the ground voltage VSS. The gate of the NMOS transistor MN 10 is connected to the gate of the NMOS transistor MN9.

At the gate of the diode-connected MOS transistor MP9, the first subsidiary bias voltage Vp2 is outputted and, at the gates of MOS transistors MN7 and MN8 that constitutes the third current-mirror 410, the second subsidiary bias voltage Vn2 is outputted.

Figure 8:
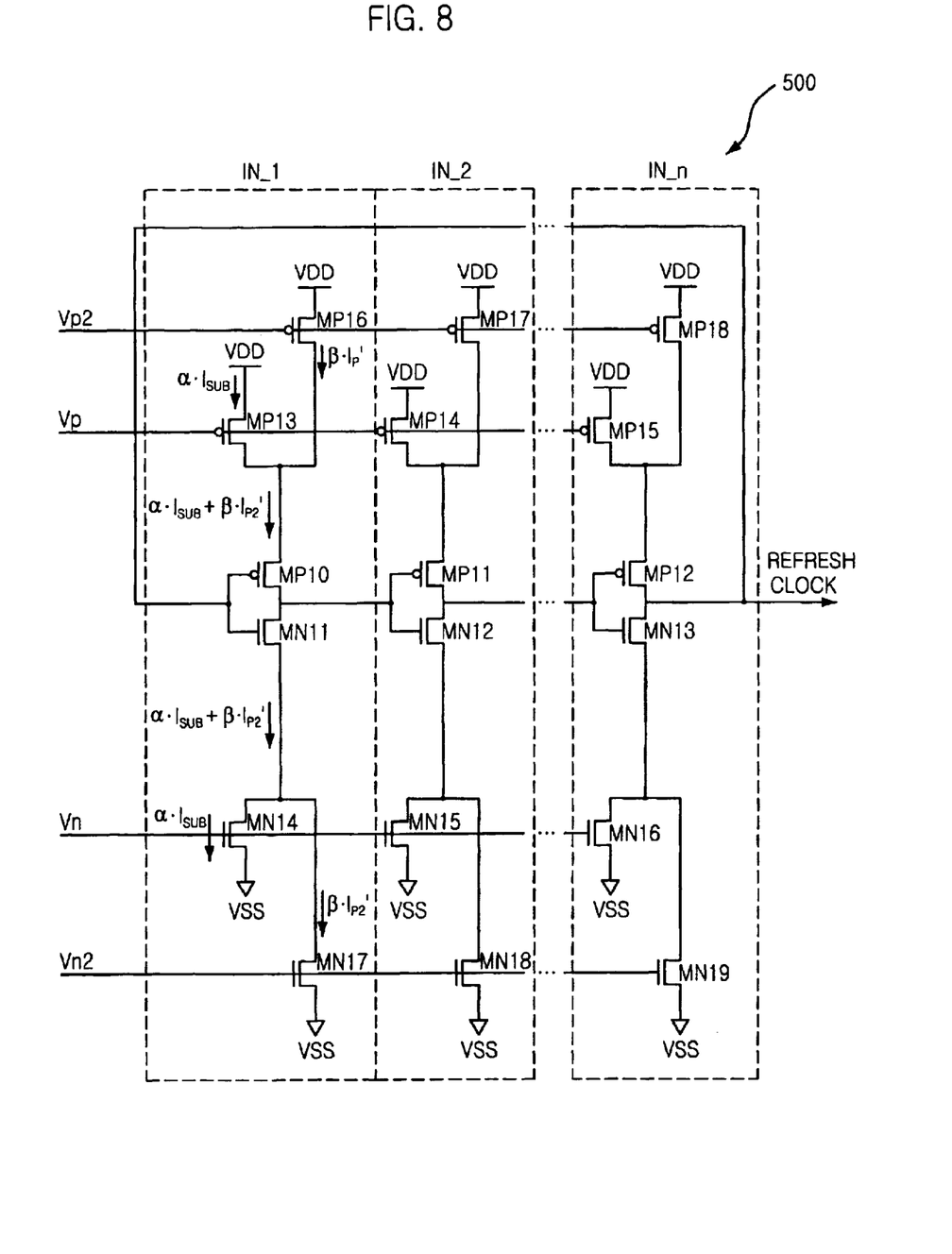
FIG. 8 is a circuit diagram of the clock generator shown in FIG. 6.

FIG. 8 is a circuit diagram of the clock generator shown in FIG. 6 in accordance with a preferred embodiment of the present invention.

As shown, the clock generator is composed of a number of inverters IN_1, IN_2, . . . , and IN_n which are serially connected to each other. Like a ring oscillator, the output of the final inverter IN_n is connected to the input of the first inverter IN_1. For operation of each inverter, there are needed the first and the second bias voltages and the first and the second subsidiary bias voltages.

Each inverter IN_1, IN_2, . . . , and IN_n has MOS transistors MP10 and MN11 for inversing the input signal which is received at their gates; a PMOS transistor MP13 for supplying a first operating current(ISUB'=α×(Ip−In')) from the supply voltage VDD like a constant current source after receiving the first bias voltage Vp1 at its gate; a PMOS transistor MP16 for supplying a second operating current (β×Ip') from the supply voltage VDD like a constant current source after receiving the first subsidiary bias voltage Vp2 at its gate; a NMOS transistor MN14 for supplying the first operating current(ISUB'=α×(Ip−In')) to the ground voltage VSS like a constant current source after receiving the second bias voltage Vp2 at its gate; and a NMOS transistor MN17 for supplying the second operating current($\beta \times$Ip') from the supply voltage VDD like a constant current source after receiving the second subsidiary bias voltage Vp2 at its gate.

The last inverter IN_n outputs the refresh clock signal to a refresh operation unit shown in FIG. 1.

Hereinafter, referring to FIG. 6 to FIG. 8, there is explained the refresh clock generator in accordance with the preferred embodiment in detail.

First, the operation of the temperature adaptive current generating circuit is explained hereinafter.

If the supply voltage VDD is supplied to the bias voltage generating unit 1000, the PMOS transistors MP2 and MP1 of the first temperature adaptive current generating circuit are turned on and the NMOS transistors MN1 and MN2 are also turned on so that the first current Ip is flowed through the PMOS transistor MP1 and the NMOS transistor MN1. In this case, a W/L(width/length) ratio of the PMOS transistor MP2, the PMOS transistor MP1, and the PMOS transistor MP3 is 1:1:1 and, moreover, the W/L(width/length) ratio of the NMOS transistor MN1 and the NMOS transistor MP2 is also 1:1.

According to the first current drop across each of the diodes D1 and D2, which is made by the bipolar transistor of which emitter is connected to its base, is denoted by 'Vbe1' and 'Vbe2'. Thus, Vbe1 is represented by Eq. 1, and the first current Ip is described by Eq. 2.

$$Vbe1 = Vbe2 + Ip \times Rp \qquad \text{Eq. 1}$$

$$Ip = 1/Rp \times (Vbe1 - Vbe2) \qquad \text{Eq. 2}$$

In addition, the voltage between the base and the emitter of the bipolar transistor, i.e., the voltage drop across each of the diodes D1 and D2 which is made by the bipolar transistor of which emitter is connected to its base, can be declared by Eq. 3.

$$Vbe1 = VT \times \ln(I/Is1), \quad Vbe2 = VT \times \ln(I/Is2) \qquad \text{Eq. 3}$$

where Is1 and Is2 are saturation current; and I represents a current flowing collector to emitter.

At here, the saturation currents Is1 and Is2 are currents that are flowed from the collector to the emitter if a backward bias voltage between the emitter and the collector is supplied above several times. In reference, the backward bias voltage is generated in the state that a negative voltage is supplied to the collector of the diode-connected transistor. The collector in NPN bipolar transistor is connected to its base.

Thus, if the Eq.2 is substituted according to the Eq.3, the following can be made.

$$Ip = VT/Rp[\ln(I/Is1) - \ln(I/Is2)] \qquad \text{Eq. 4}$$
$$= VT/Rp[\ln(Is2/Is1)]$$

Where 'VT' is kT/q; k is Boltzmann constant; T is temperature; q is a electron charge capacity, therefore Eq. 4 can be to substituted with Eq. 5.

$$Ip = kT/q \times 1/Rp \times \ln(Is2/Is1) \qquad \text{Eq. 5}$$

If Eq. 5 is partially differentiated by a temperature, Eq. 6 can be derived as follows.

$$\partial Ip/\partial T \approx k/q \times 1/Rp \times \ln(Is2/Is1) \qquad \text{Eq. 6}$$
$$\approx +0.087 \text{ mV/}^\circ \text{C.} \times 1/Rp \times \ln(Is2/Is1)$$

So, from Eq. 6, the first current Ip of the first temperature adaptive current generating circuit 100 is in proportion to a temperature.

Next, the operation of the second temperature adaptive current generating circuit 200 in the bias voltage generating unit 1000 is described. If the supply voltage VDD is supplied in the refresh clock generator, the PMOS transistors MP5 and MP6 in the second temperature adaptive current generating circuit are turned on and the NMOS transistors MN3 and MN4 are turned on so that the second current In is flowed through the PMOS transistor MP5 and the NMOS transistor MP3. In that case, the W/L(width/length) ratio of the PMOS transistor MP5, the PMOS transistor MP6, and the PMOS transistor MP7 is 1:1:1 and, moreover, the W/L(width/length) ratio of the NMOS transistor MN3 and the NMOS transistor MP4 is also 1:1.

Herein, the diode D3 is formed by the diode-connected bipolar transistor of which emitter is connected to its base and the voltage between both terminals of diode, which generated by the second current In, is called by 'Vbe3'. So, the second current In can be described by the following equation.

$$Vbe3 = In \times Rn \rightarrow In = Vbe3/Rn \qquad \text{Eq. 7}$$

If Eq. 7 is partially differentiated by a temperature, Eq. 8 is derived as follows.

$$\partial \ln/\partial T = (\partial Vbe3/\partial T) \times 1/Rn + \qquad \text{Eq. 8}$$
$$Vbe3 \times (\partial Rn/\partial T \times 1/R2n)$$
$$\approx (\partial Vbe3/\partial T) \times 1/Rn$$

Herein, because the variation of a resistance according to a temperature is relatively smaller than that of Vbe3, the following condition can be obtained.

$$|(\partial Vbe3/\partial T) \times 1/Rn| >> |Vbe3 \times (\partial Rn/\partial T \times 1/R2n)|$$

Thus, in Eq. 8, the term of 'Vbe3$\times (\partial Rn/\partial T \times 1/R2n)$' can be omitted.

In addition, the partial differentiation of 'Vbe' by a temperature can be represented by the following equation.

$$\partial Vbe/\partial T \approx -1.62 \text{ mV/}^\circ \text{C. (if } T=27^\circ \text{ C.)} \qquad \text{Eq. 9}$$

If Eq. 8 is substituted by Eq. 9, the following Eq. 10 can be obtained.

$$\partial \ln/\partial T \approx 1.62 \text{ mV/}^\circ \text{C.} \times 1/Rn \qquad \text{Eq. 10}$$

Thus, as seen from Eq. 10, the second current In of the second temperature adaptive current generating circuit 200 is in inverse proportion to a temperature.

Next, the operation of the bias voltage generator 300 is described hereinafter.

The first current-mirror 310 in the bias voltage generator 300 generates the third current In' mirrored from the second current In, which is equal to the second current In outputted from the second temperature adaptive current generating circuit 200, and flows the third current In' to the ground voltage VSS. The W/L ratio of the NMOS transistors MN5 and MN6 in the first current-mirror 310 should be 1:1.

In addition, the second current-mirror 320 in the bias voltage generator 300 generates the sixth current ISUB' mirrored from the fifth current(ISUB=Ip−In'), which subtracts the third current from the first current outputted from the first temperature adaptive current generating circuit 100, and flows the sixth current ISUB' to the ground voltage VSS. The W/L ratio of the NMOS transistors MN7 and MN8 in the second current-mirror 310 should be 1:α for mirroring the sixth current ISUB' as a times as the forth current.

If the sixth current ISUB' is flowed through the PMOS transistor MP8 and the NMOS transistor MN8, the first bias voltage Vp1 is supplied to the gate and the drain of the PMOS transistor MP8 and the second bias voltage Vn1 is supplied to the gate of the NMOS transistor MN8.

Because the first current Ip is increased in proportion to an increased temperature and the second and the third currents In and In' are decreased in inverse proportion to the increased temperature, the fifth current ISUB, which subtracts the third current In' from the first current Ip, is increased in proportion to the increased temperature. Therefore, the sixth current mirrored from a current, which multiplies the forth current ISUB by α, is increased in proportion to a temperature, so the first bias voltage Vp1 is increased in proportion to increased temperature.

In the other hand, the PMOS transistor MP4 included in the subsidiary bias voltage generator 400 outputs the sixth current Ip' mirrored from the first current Ip and the third current-mirror 410 outputs the eighth current(β×Ip') mirrored from the seventh current Ip'. The W/L ratio of the NMOS transistors MN9 and MN10 in the second current-mirror 310 should be 1:β for mirroring the eighth current (β×Ip') as β times as the seventh current Ip'.

If the eighth current(β×Ip') is flowed through the PMOS transistor MP9 and the NMOS transistor MN10, the first subsidiary bias voltage Vp2 is supplied at the gate and the drain of PMOS transistor MP9 and the second subsidiary bias voltage Vn2 is supplied to the gate of the NMOS transistor MN10.

The first current Ip is increased in proportion to the increased temperature and the seventh current mirrored from it also increases in proportion with temperature increase. Therefore, the eighth current(β×Ip') mirrored from the seventh current Ip' is increased in proportion to the increased temperature, so the first subsidiary bias voltages Vp2 is increased in proportion to the increased temperature.

Next, the operation of the clock generator 500 is going to be discussed hereinafter.

The clock generator 500, as shown in FIG. 8, has a number of inverters IN_1, IN_2, IN_3, . . . , and IN_N like a typical ring generator. Therefore, the description how the clock generator 500 generates a clock signal is omitted because it is similar to that of a typical ring generator. And then, the operation of an inverter which is a specific part of the present embodiment is subsequently discussed in detail hereinafter.

Each inverter—ex. IN_1—has two PMOS transistors MP13 and MP16 and two NMOS transistors MN14 and MN17 which have the function of a constant current source. The operation current in one of inverters IN_1, IN_2, IN_3, . . . , and IN_N will be described because the operation of all inverters in the clock generator 500 is substantially same.

For instance, as understood in the inverter IN_1, a PMOS transistor MN13 generates the sixth current(ISUB'=α× ISUB) which is flowed from the supply voltage VDD to source of a PMOS transistor MP10 after receiving the first bias voltage Vp1. The NMOS transistor MN14 generates the sixth current ISUB' which is flowed from source of a NMOS transistor MN11 to the ground voltage VSS after receiving the second bias voltage Vn1 at it's gate.

Also, a PMOS transistor MN16 generates a current(β×Ip') which is flowed from the supply voltage VDD to the source of the PMOS transistor MP10 after receiving the first subsidiary bias voltage Vp2. The NMOS transistor MN17 generates the current(β×Ip') which is flowed the source of the NMOS transistor MN11 to the ground voltage VSS after receiving the second subsidiary bias voltage Vn2 at it's gate. The MOS transistors MP10 and MN11 inverse a received signal of it's gate and thereby outputs the inverted signal to the next inverter.

As results, the operating current amount of inverter IN_1 is α×ISUB+β×Ip' that adds the sixth current ISUB'(=α× ISUB) to the eighth current(β×Ip'). The α×ISUB is generated by multiplying the fifth current ISUB by a and thereon mirroring, which is flowed through the second current-mirror 320 of the bias voltage generator 300, by the PMOS transistor MP13 of the inverter IN_1. The β×Ip' is generated by multiplying the seventh current Ip' by β and thereon mirroring, which is flowed through the third current-mirror 410 of the subsidiary bias voltage generator 400, by the PMOS transistor MP16 of the inverter IN_1.

Moreover, as above statement, the first bias voltage Vp1 and the first subsidiary bias voltages Vp2 are in proportion to a temperature.

Therefore, the operating current(α×ISUB+β×Ip') of the inverter in the clock generator 500 is increased in proportion to an increased temperature, so the clock generator 500 generates a high frequency refresh clock signal in proportion to the increased temperature and generates a low frequency refresh clock signal in proportion to the decreased temperature.

As a frequency of the refresh clock signal is increased in proportion to the increased temperature, a refresh operation is often occurred at a high temperature states when the refresh operation is more often needed and, in contrast, is occasionally occurred at a low temperature states when the refresh operation is not often needed, if the refresh operation in the semiconductor device, such as DRAM etc., is occurred by using the refresh clock signal.

Therefore, if the refresh clock signal of the present invention is used at the refresh operation unit, there is surprisingly reduced current consumption which is generated by an unnecessary operation at a low temperature because the period of the refresh clock signal is longer at the low temperature than at the high temperature.

Figure 9:
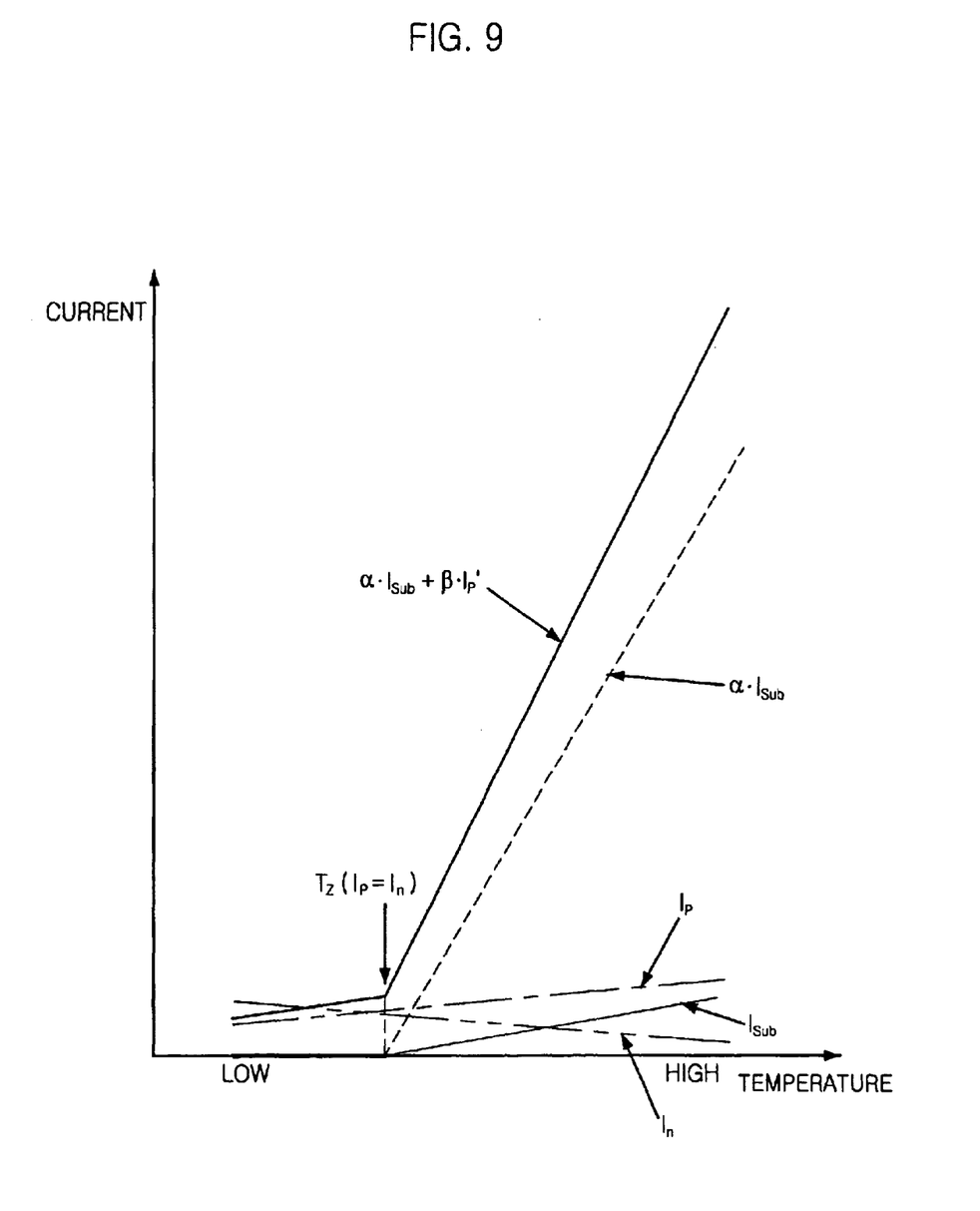
FIG. 9 describes a graph showing a relationship of currents and a temperature in the bias voltage generating unit shown in FIG. 7.

FIG. 9 describes a graph showing a relationship of several currents and temperature in the bias voltage generating unit shown in FIG. 7.

As shown, there are described the first current Ip which is increased in proportion to an increased temperature and the second current In which is increased in inverse proportion to the increased temperature. Also, there is shown the relationship of the sixth current ISUB', which is generated by multiplying the fifth current ISUB by α and thereon mirroring, and a temperature.

In the present invention, the first current is in proportion to a temperature variation and the second current is in proportion to an inverse temperature variation so that the refresh clock signal having an increased frequency is generated at a high temperature by using the fifth current ISUB.

If the refresh clock signal is generated in response to only the first current Ip which is in proportion to a temperature variation, the refresh clock signal having a high frequency can be generated in proportion to an increased temperature.

Though a frequency of a preferred refresh clock signal is doubled in response to a temperature variation whenever about 15° C. increases, the preferred refresh clock can't be generated by using only the operating current which multiplies the first current Ip by β in proportion to the temperature variation.

Thus, in the present invention, after the first current Ip is generated in proportion to a temperature variation and the second current In is generated in inverse proportion to a temperature variation, the bias voltages Vp1 and Vn1 are generated in response to the fifth current ISUB that subtracts the forth current In', which is mirrored from the second current in inverse proportion to the temperature variation, from the first current Ip being in proportion to the temperature variation. Then, the refresh clock signal is generated by using the bias voltages Vp1 and Vn1. The refresh clock signal generated by using this way has a preferred clock frequency according to a temperature variation.

In the other hand, if the refresh clock generator uses only the bias voltages Vp1 and Vn1 generated in above manner, there can be occurred the problem that the first and the second bias voltages Vp and Vn are not supplied at an extremely low temperature, because the first current Ip is smaller than the second current In at the predetermined low temperature and the fifth current ISUB, which is generated in response to the first and the second current Ip and In and severs as a bias current, is not generated below the low temperature, i.e., 0° C.

The 'Tz' point shown in FIG. 9 is a condition that the first current amount Ip is same to the second current amount. It can be understood by a current curve of the sixth current (ISUB'=α×ISUB) in the graph that the fifth current is not generated below 0° C.

The subsidiary bias voltage generator 400 is included for solving this problem in the present invention. In the subsidiary bias voltage generator 400, the first and the second subsidiary bias voltages Ip2 and In2 are generated by only the first current Ip in response to a temperature variation.

The α×ISUB+β×Ip' curve, shown in FIG. 9, describes the operating current generated by the first and the second bias voltages Vp1 and Vn1 and the first and the second subsidiary bias voltages Vp2 and Vn2. Namely, the refresh clock signal is generated by the refresh clock generator in response to the first and the second subsidiary bias voltages Vp2 and Vn2 at a low temperature under 0° C.

In additional, the refresh operation of a typical semiconductor device is occurred at a normal temperature, e.g., about 25° C. It is rare that the refresh operation is occurred at a low temperature under, e.g., 0° C. Thus, if the semiconductor device in accordance with the present invention is not used at a sufficient low temperature, e.g., 0° C., the subsidiary bias voltage generator 400 can be omitted. In this case, several inverters IN_1, IN_2, IN_3, . . . , and IN_N in the clock generator 500 can have each PMOS transistor MP13 and NMOS transistor MN14 which functions as a constant current source.

Figure 10:
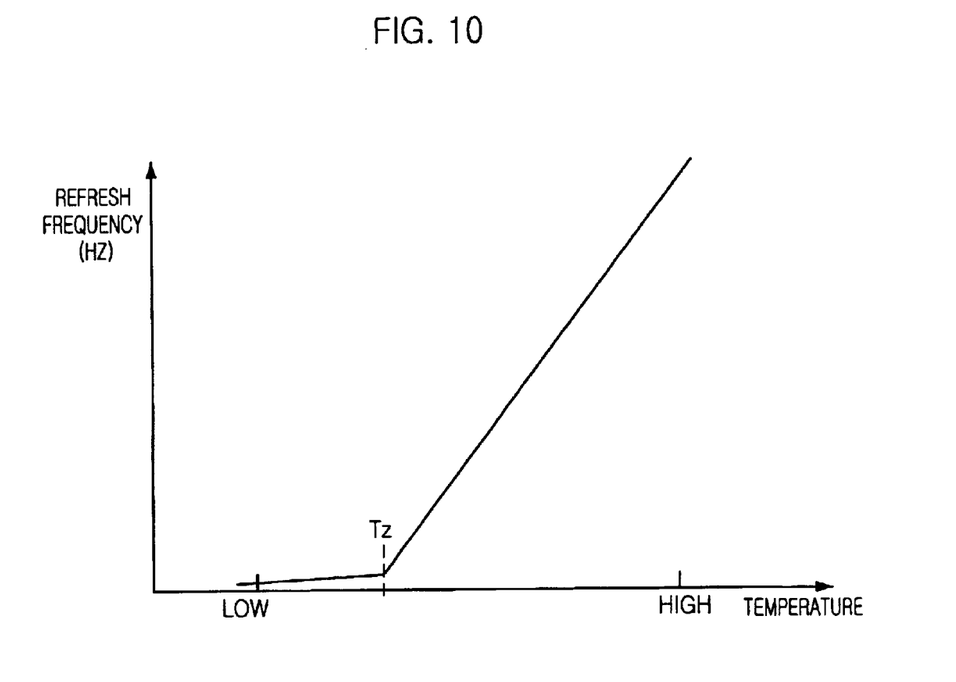
FIG. 10 describes a graph showing the characteristic of a refresh frequency versus a temperature of the refresh clock generator shown in FIG. 6.

FIG. 10 describes a graph showing the characteristic of a refresh frequency versus a temperature of the refresh clock generator shown in FIG. 6.

As shown, the frequency of the refresh clock signal is increased in proportion to an increased temperature. Especially, the frequency of the refresh clock signal is rapidly increased above the 'Tz' point which means the condition that the first current Ip is equal to the second current In.

Figure 11:
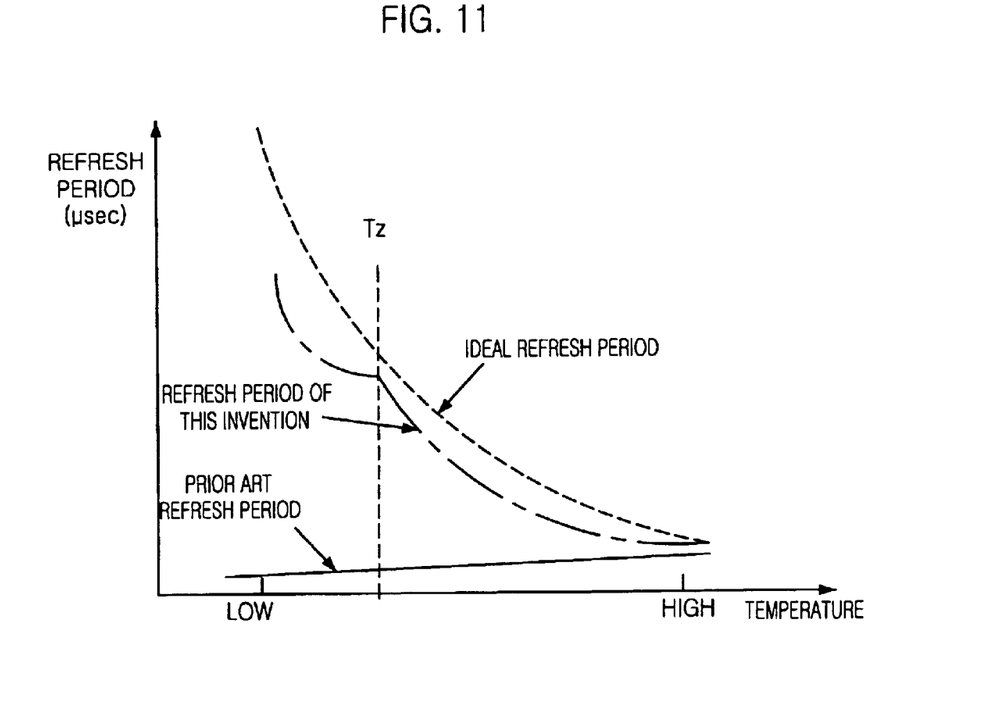
FIG. 11 is a graph that presents the characteristic of a refresh period versus a temperature of the refresh clock generator shown in FIG. 6.

FIG. 11 is a graph that presents the characteristic of a refresh period versus temperature of the refresh clock generator shown in FIG. 6.

As Shown, if the refresh operation is occurred by using the refresh clock signal in accordance with the present invention, a period of the refresh clock signal being similar to that of the ideal refresh clock signal can be gotten in response to a temperature variation. In addition, the period of the refresh clock signal according to the prior art is also drawn for easily understanding effect of the present invention by comparing three curves as shown.

The refresh clock signal of the present invention has a similar period of the ideal refresh operation and, especially, the frequency of the refresh clock signal is not discontinuously changed by a periodic temperature variation but continuously changed by a minute temperature variation. Thus, total current consumption of the semiconductor device in accordance with the present invention can be surprisingly reduced.

If the refresh operation is occurred by using the refresh clock outputted from the refresh clock generator in accordance with the present invention, the refresh operation is occurred at the preferred refresh period in response to a temperature variation.

Also, the total current consumption can be surprisingly reduced by controlling that the period of the refresh operation is long at a high temperature or short at a low temperature. Moreover, because the refresh clock signal of the present invention has the preferred frequency which is continuously changed according to temperature variation, the preferred refresh execution can be occurred in response to detailed temperature variation. So, the current consumption is greatly reduced even though the semiconductor device in accordance with the present invention is operated on any temperature range.

While the present invention has been described with respect to the particular embodiments, it will be apparent to those skilled in the art that various changes and modifications may be made without departing from the spirit and scope of the invention as defined in the following claims.

What is claimed is:

1. A refresh clock generator, comprising:
   a first temperature adaptive current generating circuit for outputting a first current in proportion to temperature variation;
   a second temperature adaptive current generating circuit for outputting a second current in inverse proportion to temperature variation; and
   a bias voltage generator for receiving the first and second currents and outputting first and second bias voltages corresponding to a third current that subtracts the second current from the first current.

2. The refresh clock generator as recited in claim 1, further comprising:
   a clock generator for receiving the first and second bias voltages and generating a refresh clock signal having a frequency which is controlled or adjusted based on the first and the second bias voltage.

3. The refresh clock generator as recited in claim 2, further comprising:
   a subsidiary bias voltage generator for receiving the first current and outputting first and second subsidiary bias voltages to the clock generator in response to the first current.

4. The refresh clock generator as recited in claim 3, wherein the bias voltage generator includes:
   a first current mirror device for outputting the third current mirrored from the second current;
   a second current mirror device having a first MOS transistor for outputting a fifth current mirrored from a forth current which subtracts the third current from the first current; and a second MOS transistor diode-connected between a supply voltage and the second current mirror device for outputting the fifth current to the second current mirror device, wherein gate of the second MOS transistor outputs a first bias voltage and gate of the first MOS transistor outputs a second bias voltage.

5. The refresh clock generator as recited in claim 4, wherein the clock generator including several inverters is operated by a first operating current corresponding to the first and second bias voltages and a second operating current corresponding to the first and second subsidiary bias voltages and outputs the refresh clock signal having a frequency which is controlled or adjusted based on the first and the second operating currents.

6. The refresh clock generator as recited in claim 5, wherein the inverter includes:

a third MOS transistor for forming a current-mirror device with the second MOS transistor in the bias voltage generator, source of the third MOS transistor being connected to a supply voltage and gate of the third MOS transistor being connected to gate of the second MOS transistor;

a fourth MOS transistor for forming a current-mirror device with the first MOS transistor that constitutes the second current mirror device in the bias voltage generator, source of the fourth MOS transistor being connected to a ground voltage and gate of the fourth MOS transistor being connected to gate of the first MOS transistor;

a fifth MOS transistor for receiving an output of the subsidiary bias voltage generator at gate, source of the fifth MOS transistor being connected to the supply voltage;

a sixth MOS transistor for receiving another output of the subsidiary bias voltage generator at gate, source of sixth MOS transistor being connected to the ground voltage;

a seventh MOS transistor of which source is connected to the drains of the third and the fifth MOS transistors; and a eighth MOS transistor of which source is connected to the drains of the fourth and the sixth MOS transistor, wherein gates of the seventh and the eighth MOS transistor is coupled to a inputted signal and the seventh and eighth MOS transistor output a inversed signal through a node between drain of the seventh MOS transistor and drain of the eighth MOS transistor.

7. The refresh clock generator as recited in claim 6, the fifth current is made by mirroring a current which multiplies the fourth current by α.

8. The refresh clock generator as recited in claim 7, the first temperature adaptive current generating circuit includes:

a first PMOS transistor diode-connected by connecting source to gate, source of first PMOS transistor being connected to the supply voltage;

a second PMOS transistor for forming current mirror with the first PMOS transistor, source of the second PMOS transistor being connected to the supply voltage and gate of the second PMOS transistor being connected to the gate of the first PMOS transistor;

a first NMOS transistor diode-connected by connecting gate and drain, the drain of the first NMOS transistor being connected to the drain of the second PMOS transistor;

a second NMOS transistor for forming current-mirror with the first NMOS transistor, drain of the second NMOS transistor being connected to the drain of the first PMOS transistor and gate of the second NMOS transistor being connected to the gate of the first NMOS transistor;

a first diode having a plus input connected to the source of the first NMOS transistor and a minus input connected to the ground voltage;

a first resistor connected to the source of the second NMOS transistor;

a second diode having a plus input connected to the resistor and a minus input connected to the ground voltage; and a third PMOS transistor for forming a current mirror device with the first PMOS transistor, source of the third PMOS transistor being connected to the supply voltage and gate of the third PMOS transistor being connected to the gate of the first PMOS transistor, wherein the first current is mirrored by the third PMOS transistor.

9. The refresh clock generator as recited in claim 8, the second temperature adaptive current generating circuit includes:

a fourth PMOS transistor diode-connected by connecting source to gate, source of the fourth PMOS transistor being connected to the supply voltage;

a fifth PMOS transistor for forming current mirror with the fourth PMOS transistor, source of the fifth PMOS transistor being connected to the supply voltage and gate of the fifth PMOS transistor being connected to the gate of the first PMOS transistor;

a third NMOS transistor diode-connected by connecting gate and drain, the drain of the third NMOS transistor being connected to the drain of the fifth PMOS transistor;

a fourth NMOS transistor for forming a current mirror device with the third NMOS transistor, drain of the fourth NMOS transistor being connected to the drain of the fourth PMOS transistor and gate of the fourth NMOS transistor being connected to the gate of the third NMOS transistor;

a third diode having a plus input connected to the third NMOS transistor and a minus input connected to the ground voltage;

a second resistor coupled between the source of the fourth NMOS transistor and the ground voltage; and a sixth PMOS transistor for forming a current mirror device with the fourth PMOS transistor, source of sixth PMOS transistor being connected to the supply voltage and gate of sixth PMOS transistor being connected to the gate of the forth PMOS transistor, wherein the second current is mirrored by the sixth PMOS transistor.

10. The refresh clock generator as recited in claim 9, the subsidiary bias voltage generator includes:

a seventh PMOS transistor for outputting a sixth current mirrored from the first current and forming a current mirror device with the first PMOS transistor, source of the seventh PMOS transistor being connected to the supply voltage and gate of the seventh PMOS transistor being connected to the gate of the first PMOS transistor;

a third current mirror device having a fifth MOS transistor for outputting a seventh current mirrored from the sixth current; and a sixth MOS transistor diode-connected by connecting source to gate for outputting the seventh current to the third current mirror device, source of sixth MOS transistor being connected to the supply voltage, wherein the gate of the fifth MOS transistor outputs a the first subsidiary bias voltage and the gate of the third MOS transistor outputs a second subsidiary bias voltage.

11. A semiconductor device having a refresh operation unit for performing a refresh operation in response to a refresh clock, comprising:

a first temperature adaptive current generating circuit for outputting a first current in proportion to temperature variation;

a second temperature adaptive current generating circuit for outputting a second current in inverse proportion to temperature variation; and a bias voltage generator for receiving the first and second currents and outputting first and second bias voltages corresponding to a third current that subtracts the second current from the first current.

12. The semiconductor device of claim 11, further comprising:

a clock generator for receiving the first and second bias voltages and generating a refresh clock signal having a frequency which is controlled or adjusted based on the first and the second bias voltage.

13. The semiconductor device of claim 12, further comprising:

a subsidiary bias voltage generator for receiving the first current and outputting first and second subsidiary bias voltages to the clock generator in response to the first current.

14. The semiconductor device of claim 13, wherein the bias voltage generator includes:

a first current mirror device for outputting the third current mirrored from the second current;

a second current mirror device having a first MOS transistor for outputting a fifth current mirrored from a forth current which subtracts the third current from the first current; and a second MOS transistor diode-connected between a supply voltage and the second current mirror device for outputting the fifth current to the second current mirror device, wherein gate of the second MOS transistor outputs a first bias voltage and gate of the first MOS transistor outputs a second bias voltage.

15. The semiconductor device of claim 14, wherein the clock generator including several inverters is operated by a first operating current corresponding to the first and second bias voltages and a second operating current corresponding to the first and second subsidiary bias voltages and outputs the refresh clock signal having a frequency which is controlled or adjusted based on the first and the second operating currents.

16. The semiconductor device of claim 15, wherein the inverter includes:

a third MOS transistor for forming a current-mirror device with the second MOS transistor in the bias voltage generator, source of the third MOS transistor being connected to a supply voltage and gate of the third MOS transistor being connected to gate of the second MOS transistor;

a fourth MOS transistor for forming a current-mirror device with the first MOS transistor that constitutes the second current mirror device in the bias voltage generator, source of the fourth MOS transistor being connected to a ground voltage and gate of the fourth MOS transistor being connected to gate of the first MOS transistor;

a fifth MOS transistor for receiving an output of the subsidiary bias voltage generator at gate, source of the fifth MOS transistor being connected to the supply voltage;

a sixth MOS transistor for receiving another output of the subsidiary bias voltage generator at gate, source of sixth MOS transistor being connected to the ground voltage;

a seventh MOS transistor of which source is connected to the drains of the third and the fifth MOS transistors; and a eighth MOS transistor of which source is connected to the drains of the fourth and the sixth MOS transistor, wherein gates of the seventh and the eighth MOS transistor is coupled to a inputted signal and the seventh and eighth MOS transistor output a inversed signal through a node between drain of the seventh MOS transistor and drain of the eighth MOS transistor.

17. The semiconductor device of claim 16, the fifth current is made by mirroring a current which multiplies the forth current by $\alpha$.

18. The semiconductor device of claim 17, the first temperature adaptive current generating circuit includes:

a first PMOS transistor diode-connected by connecting source to gate, source of first PMOS transistor being connected to the supply voltage;

a second PMOS transistor for forming current mirror with the first PMOS transistor, source of the second PMOS transistor being connected to the supply voltage and gate of the second PMOS transistor being connected to the gate of the first PMOS transistor;

a first NMOS transistor diode-connected by connecting gate and drain, the drain of the first NMOS transistor being connected to the drain of the second PMOS transistor;

a second NMOS transistor for forming current-mirror with the first NMOS transistor, drain of the second NMOS transistor being connected to the drain of the first PMOS transistor and gate of the second NMOS transistor being connected to the gate of the first NMOS transistor;

a first diode having a plus input connected to the source of the first NMOS transistor and a minus input connected to the ground voltage;

a first resistor connected to the source of the second NMOS transistor;

a second diode having a plus input connected to the resistor and a minus input connected to the ground voltage; and a third PMOS transistor for forming a current mirror device with the first PMOS transistor, source of the third PMOS transistor being connected to the supply voltage and gate of the third PMOS transistor being connected to the gate of the first PMOS transistor, wherein the first current is mirrored by the third PMOS transistor.

19. The semiconductor device of claim 18, the second temperature adaptive current generating circuit includes:

a fourth PMOS transistor diode-connected by connecting source to gate, source of the fourth PMOS transistor being connected to the supply voltage;

a fifth PMOS transistor for forming current mirror with the fourth PMOS transistor, source of the fifth PMOS transistor being connected to the supply voltage and gate of the fifth PMOS transistor being connected to the gate of the first PMOS transistor;

a third NMOS transistor diode-connected by connecting gate and drain, the drain of the third NMOS transistor being connected to the drain of the fifth PMOS transistor;

a fourth NMOS transistor for forming a current mirror device with the third NMOS transistor, drain of the fourth NMOS transistor being connected to the drain of the fourth PMOS transistor and gate of the fourth NMOS transistor being connected to the gate of the third NMOS transistor;

a third diode having a plus input connected to the third NMOS transistor and a minus input connected to the ground voltage;

a second resistor coupled between the source of the fourth NMOS transistor and the ground voltage; and a sixth PMOS transistor for forming a current mirror device with the fourth PMOS transistor, source of sixth PMOS transistor being connected to the supply voltage and gate of sixth PMOS transistor being connected to the gate of the fourth PMOS transistor, wherein the second current is mirrored by the sixth PMOS transistor.

20. The semiconductor device of claim 19, the subsidiary bias voltage generator includes:

a seventh PMOS transistor for outputting a sixth current mirrored from the first current and forming a current mirror device with the first PMOS transistor, source of the seventh PMOS transistor being connected to the supply voltage and gate of the seventh PMOS transistor being connected to the gate of the first PMOS transistor;

a third current mirror device having a fifth MOS transistor for outputting a seventh current mirrored from the sixth current; and a sixth MOS transistor diode-connected by connecting source to gate for outputting the seventh current to the third current mirror device, source of sixth MOS transistor being connected to the supply voltage, wherein the gate of the fifth MOS transistor outputs a the first subsidiary bias voltage and the gate of the third MOS transistor outputs a second subsidiary bias voltage.

* * * * *